No. 776,108. PATENTED NOV. 29, 1904.
J. A. BUCK & G. HASSLER.
HOOF PAD.
APPLICATION FILED DEC. 20, 1901.
NO MODEL.
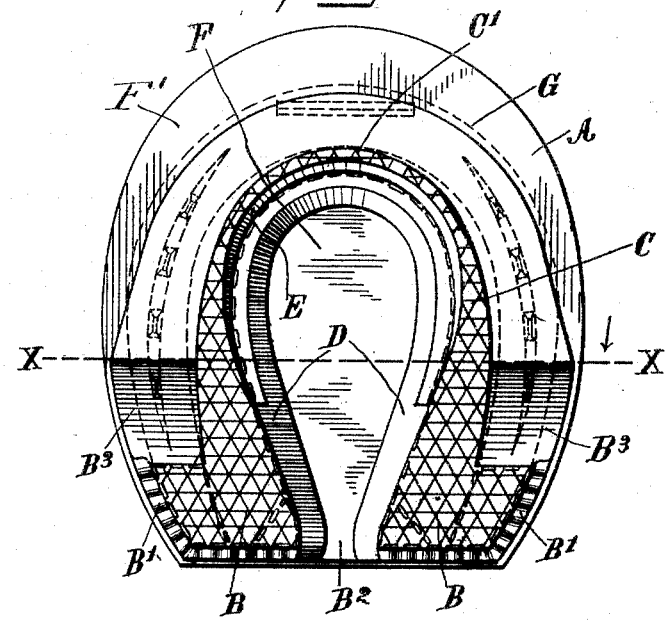
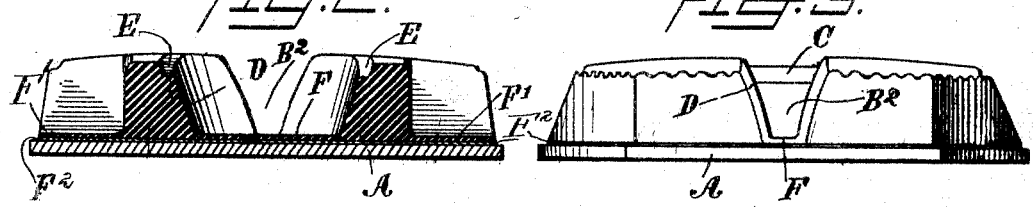
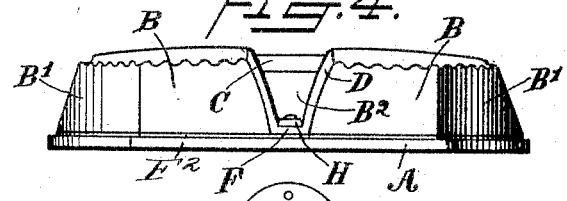
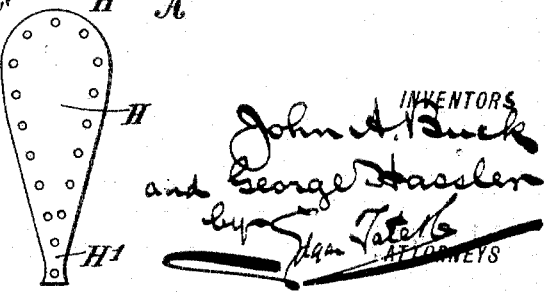
WITNESSES
INVENTORS
John A. Buck
and George Hassler
by their Attorneys No. 776,108. Patented November 29, 1904.

UNITED STATES PATENT OFFICE.

JOHN ANSON BUCK AND GEORGE HASSLER, OF NEW YORK, N. Y.

HOOF-PAD.

SPECIFICATION forming part of Letters Patent No. 776,108, dated November 29, 1904.

Application filed December 20, 1901. Serial No. 86,632. (No model.)

*To all whom it may concern:*

Be it known that we, JOHN ANSON BUCK and GEORGE HASSLER, citizens of the United States, residing at New York, in the county of New York and State of New York, have invented certain new and useful Improvements in Hoof-Pads, of which the following is a full and complete specification, such as will enable those skilled in the art to which it appertains to make and use the same.

This invention relates to that class of hoof-pads which embody leather backings adapted to be secured between the horseshoe and the hoof and which carry rubber-cushioning bodies for contact with the ground.

In the accompanying drawings, forming part of this specification, in which like letters of reference designate corresponding parts in the several views, Figure 1 is an inverted plan view of a hoof-pad embodying our invention with a horseshoe applied thereto, said horseshoe being shown in dotted lines. Fig. 2 is a section of the pad on the line $x\ x$ of Fig. 1. Fig. 3 is the rear elevation or edge view thereof. Fig. 4 is a similar view to Fig. 3 of a slightly-modified construction, and Fig. 5 is a detail forming part of the said modification.

In the practice of our invention we cut out a leather or other similar backing A, having an external contour accurately or approximately corresponding to that of a horseshoe and continuous and adapted to extend entirely across the horse's hoof. We mold a pad-body or block of rubber consisting of a bifurcated bar-pad or pair of rubber heel-pieces B, which are sewed or otherwise secured at the rear edge of the leather backing and are provided with curved or inclined outer edges B', which follow the contour of the edge of the leather backing and of the horse's hoof. A piece of canvas $F^2$ is interposed between the rubber pad and the leather backing. The bifurcated bar-pad is so cut out centrally in the formation of the two heel-pieces as to leave a relatively small vertical groove or central space $B^2$ between the mutually-approaching inner edges of the said heel-pieces, the said groove or space being downwardly or outwardly flared or of inverted-U shape for purposes which will hereinafter appear.

The bifurcated bar-pad is forwardly extended in the form of a horseshoe-shaped body C, so that the two heel-pieces B are continuous and virtually integral. The horseshoe-shaped body or extension C is contracted at its commencement from either heel-piece B about an inch from the rear edge of the pad and backing, and this contraction continues in extent so that the forward portion C' of the body C is a narrow strip. The inner edge D of the bifurcated bar-pad and its horseshoe-shaped extension C is beveled or inclined downwardly and outwardly to form in the center of the pad a vertically-conoidal pocket. Between the inclined edge D of the forward part of the horseshoe-shaped body C and the outer edge of the said body we form a circumferentially alining or parallel-groove E, which is also downwardly and outwardly inclined upon its outer edge.

The bifurcated bar-pad and its extension C are not only in the preferred form or specific scope of our invention made integral longitudinally or circumferentially or in the direction of their specific or perceptible form or contour, but they are also integrally connected by means of a thin rubber strip or layer F, extending transversely across the leather backing inside of the pad and its extension and forming a lining or cushion for the central pocket.

The rear ends of the bifurcated bar-pad are laterally extended relatively to the extension C, so as to project appreciably beyond the same and sufficiently to permit a horseshoe G to lie against the extension C, with its outer edge or periphery upon a line with the other curved edges B' of the pad. In practice a three-quarter shoe is used with our pad, as shown in Fig. 1, and, as is customary with pads adapted for use with three-quarter shoes, we form inclined or beveled edges $B^3$ upon the forward ends of the projecting portions of the pad against which the rear ends of the horseshoe lie. Outwardly of the extension C we form an integral layer F' of rubber, as best shown in Fig. 2, which rubber extends around the extension C along the line of the horseshoe and connects the beveled edges $B^3$ and prevents the said edges from being lifted up or forced away from the leather backing by rearward or longitudinal movement or jarring of the horseshoe thereagainst.

In the modified form of device shown in Figs. 4 and 5 we rivet or otherwise strongly secure within the pocket formed at the center of the pad a flat strip or sheet of metal H, generally ovoidal in form and having its rear end formed into a relatively narrowed extension H′, which lies between the approaching edges of the bifurcated bar-pad or the heel portions thereof.

The operation of the device will be readily understood from the foregoing description, taken in connection with the accompanying drawings, and the advantages resultant from the use thereof will be manifest to all who are conversant with devices of this character.

The pad is secured between the hoof and the shoe of the horse at the time the shoe is being applied and is secured by the usual horseshoe-nails, which pass through the shoe and the pad into the hoof. Any surplus leather is then trimmed or cut off. The pads must be made in sizes to conform to the different sizes of horseshoes used. The horse's hoof as it comes down on the ground is supported by a continuous cushion of rubber, the same as in a bar-pad; but this cushion of rubber has two relatively considerable peripheral edges inside and outside of the pad, which in lateral slipping of the horse's hoof or any tendency thereto operate to offer a so-largely increased area of resistance to the slipping of the foot as to reduce this slipping to what appears to be an ideally-perfect minimum.

The rear of the pad, although bifurcated, by reason of the narrowness of the space between the two parts approximates to a continuous bar-pad in so far as the cushioning effect is concerned, while having much of the effect of bifurcated pads in the matter of preventing sidewise slipping. This construction also permits the sides of the pad to lie at different heights to fit closely to irregular hoofs. By narrowing and almost closing the space between the heels B of the pad other desirable results are obtained. When the full weight of the horse rests upon the broad bifurcated heel portions, these portions are compressed or flattened and thereby expanded laterally, bringing the parts nearest the hoof in contact with each other, thereby causing each to assist the other in resisting sidewise strain, while the portions in contact with the ground will be slightly apart to engage any roughness of the ground or pavement to resist side slipping, as before explained. This lateral expansion of these portions also assists in releasing any matter packed in the pocket, as when the hoof is raised these parts will contract and draw away from the packed matter, thereby relieving the packed matter from side pressure.

The continuous backing acts as a shield for the hoof and for the frog, and the rubber strip F operates as an elastic cushion to repel nails, stones, and other foreign matter, which effect is greatly contributed to both by the inclined inner edge D of the bifurcated bar-pad and its extension C. Balling or the accumulation of snow, ice, mud, dirt, clay, or other similar matter is likewise prevented by this shield portion of the pad and by the inclined edge D, which edge forms a vertically conoidal pocket, from which by reason of its form there is a natural and constant tendency of any accumulated matter to dislodge, which effect is contributed to by the supplemental groove E in the extension C, and as the integral pocket is not closed or is not wholly or circumferentially continuous there is in practice a certain amount of vibration of the wall of the pocket, which tends to dislodge the accumulated matter before it gets too hard and set.

The widening of the rear or heel portions of the separate sides of the pad or cushion proper and the beveling of the front portions thereof constitutes one of the chief features of this invention. When the shoe is placed in position, the ends of the sides overlap the beveled portion of the pad at the opposite ends, and this, together with the widening of the said rear ends or heel portions of the separate sides of the cushion or pad proper, prevents the buckling of the pad or cushion and holds the sides thereof in proper position, and the accomplishing of this result is also facilitated by the fact that the separate side portions of the pad are brought close together at their extreme rear ends.

The shielding of the frog may be further effected by the use of the modified form shown in Figs. 4 and 5, in which there is added the metallic plate H, which will prevent any rupture of the central or thin portion of the pad or the passage of any sharp object therethrough. This metallic plate, by reason of its narrowed extension H′, which fits between the rear ends or heels of the rubber, will further operate to keep the said heel portions separated and prevent their being forced together with the consequent drawing away of the pad from contact with the rear ends of the shoe.

Having thus fully described our invention, what we claim as new, and desire to secure by Letters Patent, is—

1. A hoof-pad having a continuous cushioning-body extending entirely around between the hoof and the shoe, and at the rear projecting beyond the shoe and terminating in two broad bifurcated portions separated by a narrow space, so that pressure will cause the bifurcated portions to impinge against each other, substantially as described.

2. A hoof-pad having a flexible backing and a cushioning-body, both of said bodies extending entirely around the shoe between the shoe and the hoof, with the said cushioning-body projecting beyond the said shoe, and terminating rearwardly in two broad bifurcated portions separated by only a narrow space, so that pressure of the weight of the horse will cause the two bifurcated portions to impinge against each other, substantially as described.

3. A hoof-pad having a flexible backing and a cushioning-body both extending the entire length of the shoe, said cushioning-body terminating rearwardly in two bifurcated portions separated by only a narrow space having inclined walls making said space less adjacent the hoof, so that the weight of the horse will cause the two bifurcated portions to impinge against each other near the hoof, substantially as described.

In testimony that we claim the foregoing as our invention we have signed our names, in presence of the subscribing witnesses, this 19th day of December, 1901.

JOHN ANSON BUCK.
    GEORGE HASSLER.

Witnesses:
 F. A. STEWART,
 F. F. TELLER.